United States Patent
Kong

(10) Patent No.: US 8,476,813 B2
(45) Date of Patent: Jul. 2, 2013

(54) LAMP DEVICE

(75) Inventor: Kyung-il Kong, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 13/040,779

(22) Filed: Mar. 4, 2011

(65) Prior Publication Data

US 2011/0204764 A1     Aug. 25, 2011

(30) Foreign Application Priority Data

Sep. 17, 2010   (KR) ........................ 10-2010-0091547

(51) Int. Cl.
*H01J 61/52* (2006.01)
(52) U.S. Cl.
USPC ............................................ 313/46; 362/373
(58) Field of Classification Search
USPC ..................................... 313/46; 362/373, 183
See application file for complete search history.

(56) References Cited

U.S. PATENT DOCUMENTS

| | | | |
|---|---|---|---|
| 6,371,628 B1 | 4/2002 | Ward | |
| 6,832,849 B2 | 12/2004 | Yoneda et al. | |
| 7,458,706 B1* | 12/2008 | Liu et al. | 362/373 |
| 7,563,009 B2 | 7/2009 | Valcamp et al. | |
| 2005/0140270 A1 | 6/2005 | Henson et al. | |
| 2007/0019419 A1 | 1/2007 | Hafuka et al. | |
| 2007/0097702 A1* | 5/2007 | Crowder | 362/570 |
| 2009/0257234 A1 | 10/2009 | Zheng et al. | 362/373 |
| 2011/0204764 A1 | 8/2011 | Kong | |

FOREIGN PATENT DOCUMENTS

| | | |
|---|---|---|
| EP | 2 206 945 A1 | 7/2010 |
| JP | 2002-367406 A | 12/2002 |

OTHER PUBLICATIONS

European Search Report dated May 20, 2011 issued in Application No. 11 15 3747.
U.S. Notice of Allowance dated Mar. 15, 2012 for U.S. Appl. No. 13/087,623.
U.S. Office Action dated Nov. 23, 2011 for U.S. Appl. No. 13/087,623.
European Search Report dated Aug. 21, 2012.
U.S. Office Action dated Dec. 26, 2012 for 13/446,139.
Chinese Office Action dated Feb. 6, 2013.

* cited by examiner

*Primary Examiner* — Anh Mai
*Assistant Examiner* — Elmito Breval
(74) *Attorney, Agent, or Firm* — KED & Associates, LLP

(57) ABSTRACT

A lamp device includes a heat sink, substrate, and fixing surface. The heat sink has a body with an opening, a plurality of fins for dissipating heat, and a plate coupled to the fins. The substrate is located under the fins and is coupled to a plurality of light emitting diodes. The fixing surface is coupled to the heat sink and also has an opening. Light from the light emitting diodes is emitted to the opening of the fixing surface, and a same axis passes through the openings of the body and fixing surface.

20 Claims, 4 Drawing Sheets

LAMP DEVICE

The present application claims priority under 35 U.S.C. §119(e) of Korean Patent Application No. 10-2010-0091547 filed on Sep. 17, 2010, which is hereby incorporated by reference in its entirety.

FIELD

This embodiment relates to a lamp device.

DESCRIPTION OF THE RELATED ART

A light emitting diode (LED) is an energy device converting electric energy into light energy and has low power consumption, a semi-permanent life span, a rapid response speed, safeness and environment-friendliness as compared with existing light sources like a fluorescent light, an incandescent lamp and the like.

Therefore, many researches are devoted to substitution of the existing light sources with the LED. The LED is now increasingly used as a light source for lighting devices, for example, a liquid crystal display device, an electric sign, a street lamp, a pilot lamp, a room lamp and the like.

SUMMARY

One embodiment is a lamp device includes:

a heat radiating body comprising a structure and a plurality of fins, wherein the structure comprises an inner surface and an outer surface such that an opening is formed, and wherein a plurality of the fins extend to the outside from the outer surface of the structure; and a substrate being under a plurality of the fins of the heat radiating body and comprising a plurality of light emitting devices disposed on one side thereof.

Another embodiment is a lamp device includes:

a heat radiating body comprising a structure, a plurality of fins and a flat portion, wherein the structure comprises an inner surface and an outer surface such that an opening is formed, wherein a plurality of the fins extend to the outside from the outer surface of the structure, and wherein the flat portion is joined to one ends of a plurality of the fins;

a substrate comprising a top surface on the flat portion of the heat radiating body; and a plurality of light emitting devices disposed on the bottom surface opposite to the top surface of the substrate.

Further another embodiment is a lamp device includes:

a heat radiating body comprising a structure and a plurality of fins, wherein the structure comprises an inner surface and an outer surface such that an opening is formed and wherein a plurality of the fins extend to the outside from the outer surface of the structure, wherein two adjacent fins among a plurality of the fins of the heat radiating body are spaced from each other at a regular interval; and a substrate contacting with a plurality of the fins of the heat radiating body and comprising a plurality of light emitting devices disposed on one side thereof and a plurality of holes disposed therein.

DETAILED DESCRIPTION OF THE EMBODIMENTS

A thickness or size of each layer is magnified, omitted or schematically shown for the purpose of convenience and clearness of description. The size of each component does not necessarily mean its actual size.

It will be understood that when an element is referred to as being 'on' or "under" another element, it can be directly on/under the element, and one or more intervening elements may also be present. When an element is referred to as being 'on' or 'under', 'under the element' as well as 'on the element' can be included based on the element.

Hereinafter, an embodiment will be described with reference to the accompanying drawings.

Figure 1:
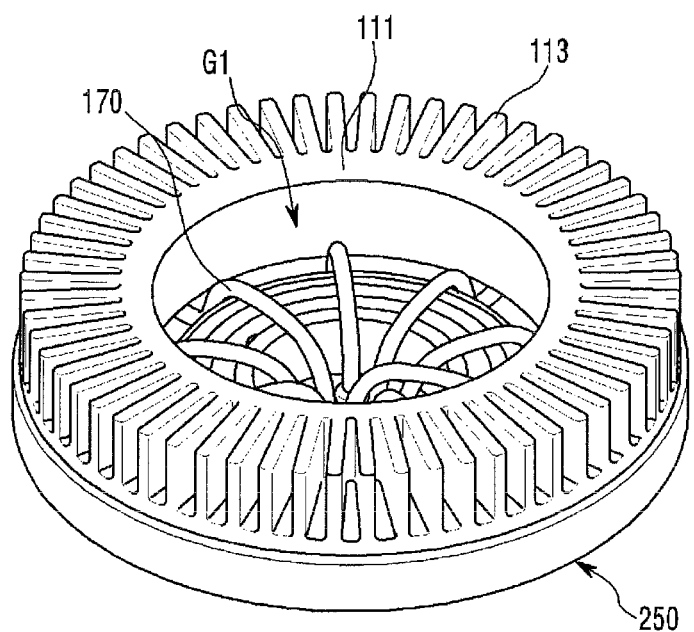
FIG. 1 is a perspective view of a lamp device according to an embodiment of the present invention.
Figure 2:
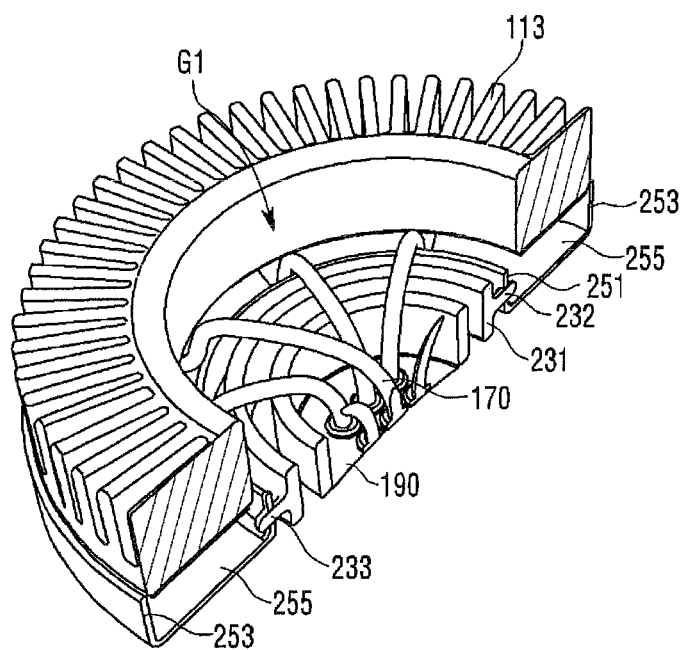
FIG. 2 is a perspective view of a cross section of the lamp device according to the embodiment shown in FIG. 1 of the present invention.
Figure 3:
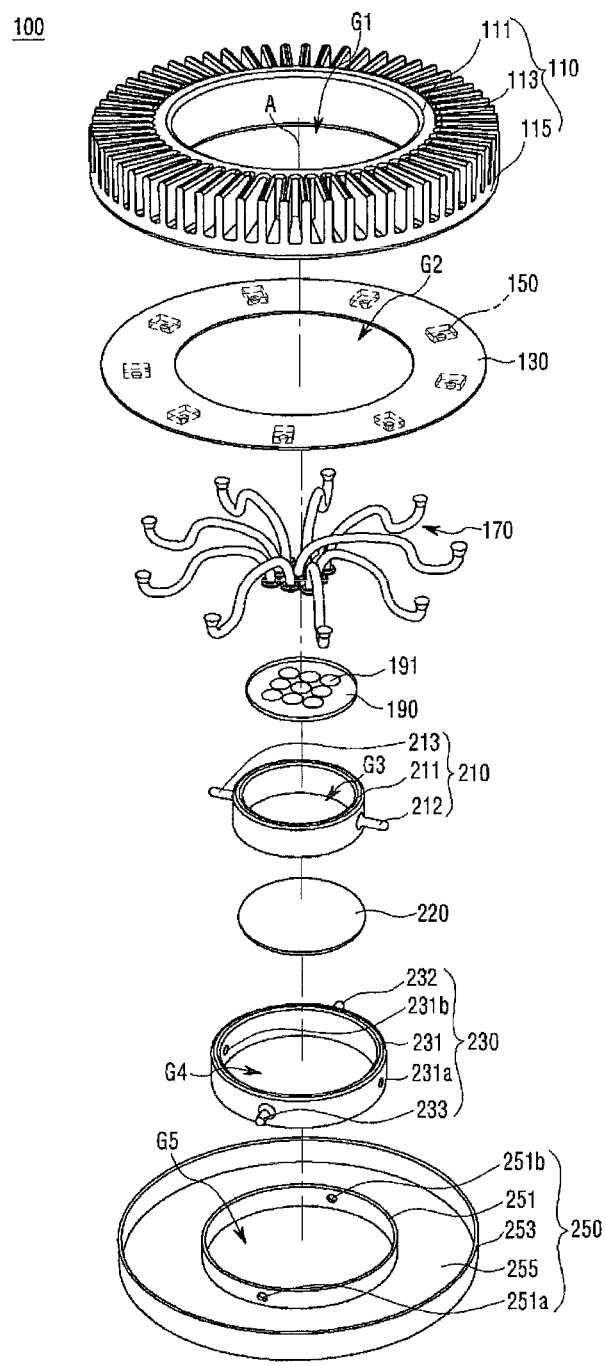
FIG. 3 is an exploded perspective view of a lamp device according to the embodiment shown in FIG. 1 of the present invention.

FIG. 1 is a perspective view of a lamp device according to an embodiment of the present invention. FIG. 2 is a perspective view of a cross section of the lamp device according to the embodiment shown in FIG. 1 of the present invention. FIG. 3 is an exploded perspective view of a lamp device according to the embodiment shown in FIG. 1 of the present invention.

Referring to FIGS. 1 to 3, a lamp device 100 according to an embodiment of the present invention includes a heat radiating body 110, a substrate 130, a light source unit 150, a light guider 170, a flange 190, a first member 210, a condensing lens 220, a second member 230 and a fixing member 250.

The heat radiating body 110 is formed by organically coupling a ring structure 111, a plurality of fins 113 and a flat portion 115, so that the heat radiating body 110 has a shape of a donut. However, the shape of the heat radiating body 110 is not limited to this. For example, the heat radiating body 110 may have a polygonal shape or other various shapes.

The ring structure 111 has an inner surface and an outer surface such that an opening G1 having a central axis "A" is formed in the center of the ring structure 111. A plurality of the fins 113 are joined to the outer surface of the ring structure 111 and radially extend to the outside from the outer surface of the ring structure 111. A plurality of the fins 113 may be separated from each other at a regular interval such that heat generated from a light source unit 150 which will be described below is wholly uniformly radiated to the outside. The flat portion 115 is joined to one end of the outer surface of the ring structure 111 and extends perpendicular to the outer surface of the ring structure 111. The flat portion 115 is joined to one ends of a plurality of the fins 113 joined to the outer surface of the ring structure 111.

The substrate 130 includes a top surface and a bottom surface. The top surface comes in surface contact with the flat portion 115 of the heat radiating body. The light source unit 150 is disposed on the bottom surface. It is desirable that a commonly used metal printed circuit board (PCB) is mainly used as the substrate 130. However, any substrate capable of including the light source unit can be used as the substrate 130.

The substrate 130 has a disk shape for sealing the ring structure 111 having the opening G1. In addition, the substrate 130 is required to have an opening G2 in the center thereof in order that heat generated from the light source unit 150 can be radiated to the outside through the circulation of the air. The opening G2 at the center of the substrate is placed corresponding to the opening G1 of the heat radiating body such that they have the same central axis "A". Here, it is required that the opening G2 at the center of the substrate and the opening G1 of the heat radiating body have the same area for the purpose of improving the assemblability and heat radiating characteristic of the lamp device.

The light source unit 150 includes a plurality of light emitting diodes (LEDs). A plurality of the LEDs are radially disposed on the bottom surface of the substrate. That is, a plurality of the LEDs may be disposed on the bottom surface of the substrate 130 at a regular interval just like a plurality of the fins 113 are disposed.

As such, when a plurality of the LEDs are radially disposed on the substrate, the radiation area of heat generated from the operation of the LEDs becomes greater, so that heat release efficiency is improved. The heat from the LEDs is radiated through the surface contact between the flat portion of the heat radiating body and the top surface of the substrate and through a plurality of the fins of the heat radiating body, As a result, heat radiating surface area is increased so that a heat transfer characteristic is improved.

Though not shown in the drawings, a conductive sheet for radiating heat is further added between the substrate 130 and the flat portion 115 of the heat radiating body 110, so that it is possible to enhance the heat transfer characteristic between the substrate 130 and the heat radiating body 110.

Since a plurality of the LEDs are mounted and disposed on one substrate instead of separate substrates, if necessary, it is possible to easily repair and maintain the substrate including the light source unit.

The light guider 170 includes a plurality of optical fibers. One end of each optical fiber is optically connected to a plurality of the LEDs 150. In the present embodiment, though the optical fiber is taken as an example of the light guider 170, any device like a prism of an optical device capable of changing the direction of light generated by the light source unit into a desired direction can be used as the light guider 170.

The flange 190 includes a plurality of holes 191 for inserting and binding the ends of a plurality of the optical fibers, and has an entire shape of a disk. Therefore, a plurality of the LEDs are bound by the flange 190, so that a wide emission area of light generated from a plurality of the radially disposed LEDs becomes smaller. As a result, the light is collected in a particular direction.

The ends of the optical fibers inserted into the holes 191 of the flange 190 are aligned with the holes 191 of the flange such that the ends are placed on the same plane. This intends to obtain the uniform intensity of light at a particular plane on which the light is incident. The flange is seated in an opening G3 of the first member 210 which will be described below, so that the flange has an optical orientation plane according to the adjustment of the angle of the first member 210.

The first member 210 includes a first projection 212, a second projection 213 and a first ring structure 211 having an inner surface and an outer surface such that a circular opening G3 having a central axis is formed in the center of the first ring structure 211. The first projection 212 and the second projection 213 are formed on the outer surface of the first ring structure 211 to face each other. The first projection 212 and the second projection 213 extend from the outer surface of the first ring structure 211 to the outside. The first projection 212 and the second projection 213 of the first member 210 are inserted into a first hole 231a and a second hole 231b of the second member 230, which are described below, respectively. Accordingly, the first member 210 is joined and fixed to the second member 230.

The first member 210 is inclined at an angle to rotate about the first projection 212 and the second projection 213. Therefore, light generated from the light source unit 150 can be directed to a direction that a user desires by through adjustment of the angle of the first member 210.

The condensing lens 220 is optically joined to the first member 210 and covers the opening opposite to the first member's circular opening in which the flange 190 is seated. Such a condensing lens more optically condenses the light which has been physically condensed by the flange.

Like the first member 210, the second member 230 includes a first projection 232, a second projection 233 and a second ring structure 231 having an inner surface and an outer surface such that a circular opening G4 having a central axis is formed in the center of the second ring structure 231. The second member 230 includes the first hole 231a and the second hole 231b into which the first and the second projections 212 and 213 of the first member 210 are inserted. The first hole 231a and the second hole 231b penetrate the inner and outer surfaces of the second ring structure 231 and face each other. The first and the second projections 232 and 233 extend from the outer surface of the second ring structure 231 to the outside.

In such a second member 230, a first imaginary line horizontally extending from the first projection 232 to the second projection 233 is at a right angle to a second imaginary line extending from the central axis of the first hole 231a to the central axis of the second hole 231b.

The circumferential extent of the inner surface of the second member 230 is greater than that of the outer surface of the first member 210, so that the first member 210 is inserted into the second member 230.

The fixing member 250 includes an inner circumferential portion 251 such that a circular opening G5 having a central axis of the inner circumferential portion 251 is formed, an outer circumferential portion 253 formed along the inner circumferential portion at a regular interval from the inner circumferential portion 251, and flat portion 255 extending vertically from the end of the inner circumferential portion to the end of the outer circumferential portion.

The inner circumferential portion 251 of the fixing member 250 includes mutually facing first and second holes 251a and 251b into which the first projection 232 and the second projection 233 are inserted. The first projection 232 and the second projection 233 of the second member 230 are respectively inserted into the first hole 251a and the second hole 251b of the fixing member 250. The second member 230 is joined and fixed to inner surface of the inner circumferential portion 251 of the fixing member 250.

The outer circumferential portion 253 of the fixing member 250 surrounds the light source unit 150 and the light guider 170.

Since the lamp device mentioned above includes a heat radiating body having a structure in which the heat generated from the light emitting diodes can be radiated spatially not in an up-and-down direction but in a horizontal direction when the lamp device is operated, the entire volume of the lamp device can be actually reduced. Accordingly, as compared with a conventional heat radiating body radiating heat in the up-and-down direction, the heat radiating body of the present invention has a lower spatial limitation when the lamp device is installed. As a result, installation flexibility can be improved.

Figure 4:
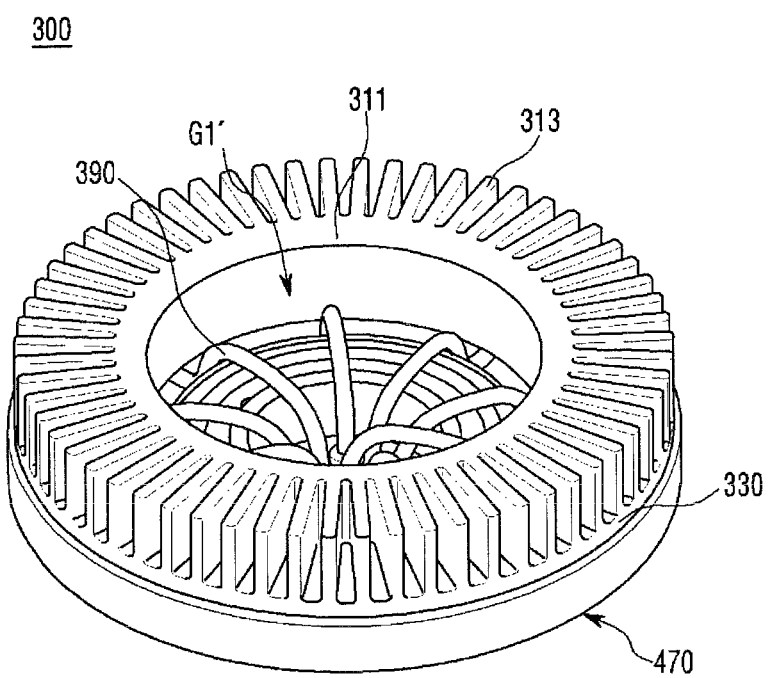
FIG. 4 is a perspective view of another lamp device according to an embodiment of the present invention.
Figure 5:
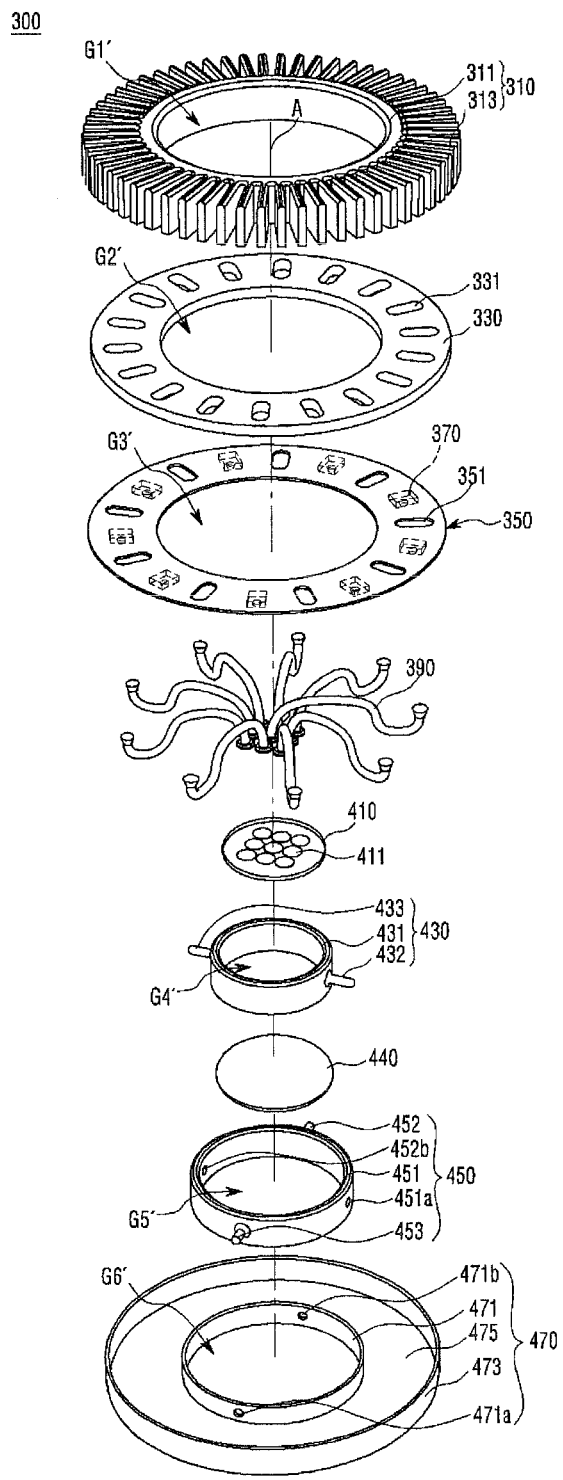
FIG. 5 is an exploded perspective view of the lamp device according to the embodiment shown in FIG. 4 of the present invention.

FIG. 4 is a perspective view of another lamp device according to an embodiment of the present invention. FIG. 5 is an exploded perspective view of the lamp device according to the embodiment shown in FIG. 4 of the present invention.

Referring to FIGS. 4 to 5, another lamp device 300 according to one embodiment of the present invention includes a heat radiating body 310, a heat radiating plate 330, a substrate 350, a light source unit 370, a light guider 390, a flange 410, a first member 430, a second member 450 and a fixing member 470.

The heat radiating body 310 is formed by organically coupling a ring structure 311 and a plurality of fins 313, so that the heat radiating body 310 has a shape of a donut. However, the shape of the heat radiating body 310 is not limited to this. For example, the structure 311 may have a polygonal shape or other various shapes. The ring structure 311 has an inner surface and an outer surface such that an opening G1' having a central axis "A" is formed in the center of the ring structure 311. A plurality of the fins 313 which are joined to the outer surface of the ring structure 311 and radially extend to the outside from the outer surface of the ring structure 311. A plurality of the fins 313 are separated from each other at a regular interval such that heat generated from a light source unit 370 which will be described below is wholly uniformly radiated to the outside. That is, two adjacent fins may be spaced apart from each other at a regular interval.

The heat radiating plate 330 includes a hole 331 located at an area corresponding to the interval between the two adjacent fins among a plurality of the fins 313, and contacts with a plurality of the radially disposed fins 313. The heat radiating plate 330 also includes a central opening G2' placed corresponding to the central opening G1' of the heat radiating body 310. The hole 331 of the heat radiating plate 330 has a rectangular shape which is actually parallel with the longitudinal direction of the fin such that the external air more easily flows in from the top of the heat radiating body. When the substrate directly contacts with a plurality of the fins of the heat radiating body, the heat radiating plate 330 may be omitted. If the heat radiating plate 330 is integrally formed with the heat radiating body 310, the heat radiating body 110 shown in FIG. 3 can be actually formed. In other words, the heat radiating plate 330 is able to function as the flat portion 115 of the heat radiating body 110 shown in FIG. 3.

The substrate 350 includes a top surface and a bottom surface. The top surface comes in surface contact with the heat radiating plate 330. The light source unit 370 is disposed on the bottom surface. It is desirable that a commonly used metal printed circuit board (PCB) is mainly used as the substrate 350. However, any substrate capable of including the light source unit can be used as the substrate 350.

The substrate 350 has a disk shape for sealing the heat radiating plate 330 having the opening G2'. In addition, the substrate 350 is required to have an opening G3' in the center thereof in order that heat generated from the light source unit 370 can be radiated to the outside through the circulation of the external air. Here, the opening G3' at the center of the substrate 350 is placed corresponding to the opening G2' of the heat radiating plate 330. Additionally, the substrate 350 includes a plurality of holes 351. A plurality of the holes 351 are placed between the light source units 370 which will be disposed on the bottom surface of the substrate.

It is more desirable that the holes of the substrate are disposed between the light source units 370 and correspond to the holes 331 of the heat radiating plate 330. Like the hole 331 of the heat radiating plate 330, the hole 351 of the substrate has also a rectangular shape.

Though not shown in the drawings, the substrate 350 is able to directly contact with a plurality of the fins of the heat radiating body and transfer heat without the heat radiating plate. It is possible to improve the heat transfer characteristic between the heat radiating body and the heat radiating plate or between the heat radiating plate and the substrate by adding a conductive sheet between the heat radiating body and the heat radiating plate or between the heat radiating plate and the substrate.

The light source unit 370 includes a plurality of light emitting diodes (LEDs). A plurality of the LEDs are radially disposed on the bottom surface of the substrate. That is, a plurality of the LEDs are disposed on the bottom surface of the substrate 350 just like a plurality of the fins 313 of the heat radiating body 310 are disposed.

As such, when a plurality of the LEDs are radially disposed on the substrate, the radiation area of heat generated from the operation of the LEDs becomes greater, so that heat release efficiency is improved. The heat from the LEDs can be radiated by the circulation of the air through the holes of either the substrate or the heat radiating plate. A plurality of the fins of the heat radiating body increase the heat radiation surface area, so that a heat transfer characteristic is improved. Though not shown in the drawings, a conductive sheet for radiating heat is further added between the substrate and the heat radiating plate, so that it is possible to enhance the heat transfer characteristic between the substrate and the heat radiating plate.

Since a plurality of the LEDs are mounted and disposed on one substrate instead of separate substrates, if necessary, it is possible to easily repair and maintain the substrate including the light source unit.

Since the light guider 390, the flange 410, the first member 430, a condensing lens 440, the second member 450 and the fixing member 470 are similar to those of the one embodiment of the present invention, the descriptions thereof will be omitted.

The features, structures and effects and the like described in the embodiments are included in at least one embodiment of the present invention and are not necessarily limited to one embodiment. Furthermore, the features, structures and effects and the like provided in each embodiment can be combined or modified in other embodiments by those skilled in the art to which the embodiments belong. Therefore, the contents related to the combination and modification should be construed to be included in the scope of the present invention.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:
1. A lamp device comprising:
a heat radiator comprising a body, a plate, and a plurality of fins, wherein the body comprises an inner surface and an outer surface and an opening, wherein the plate is coupled to the body, wherein the inner and outer surfaces of the body extend in a first direction and a surface of the plate coupled to the body extends in a second direction different from the first direction, and wherein the plurality of the fins are coupled to the outer surface of the body;

a substrate disposed under the plurality of the fins of the heat radiator and coupled to a plurality of light emitting diodes on one side thereof and having a plurality of holes between the plurality of the light emitting diodes respectively; and a fixing surface coupled to the heat radiator and having an opening, wherein at least one pair of adjacent fins among the plurality of the fins are spaced apart from each other at a predetermined interval, wherein the plate has at least one hole located in alignment with the predetermined interval between at least one pair of the adjacent fins, wherein at least two of the holes of the substrate corresponds to at least two of the holes of the plate, and wherein the plate has an opening and is located between the substrate and the plurality of fins, wherein light from the light emitting diodes is emitted to the opening of the fixing surface, wherein the substrate has an opening in alignment with the opening of the plate, and wherein a same axis is aligned with and passes through the openings of the body, the plate, the substrate, and the fixing surface.

2. The lamp device of claim 1, wherein the plate and substrate have substantially a same shape.

3. The lamp device of claim 2, wherein the substrate has an inner edge and an outer edge, wherein the inner edge of the substrate is in alignment with the inner surface of the body and wherein the outer edge of the substrate is in alignment with the outer surface of the body.

4. The lamp device of claim 1, wherein the substrate contacts the plate and the inner and outer surfaces of the body to seal the heat radiator.

5. The lamp device of claim 4, wherein the body is integrally formed with the plate.

6. The lamp device of claim 4, wherein one side of the plate contacts the plurality of the fins.

7. The lamp device of claim 6, where the hole of the plate has a substantially rectangular shape and extends in a direction that is substantially parallel with a longitudinal direction of the fin.

8. The lamp device of claim 1, further comprising:
a plurality of optical fibers,
wherein each fiber has a first end optically connected to receive light from respective ones of the plurality of the light emitting diodes and a second end to direct the light in a predetermined direction.

9. The lamp device of claim 8, further comprising:
a flange including a plurality of holes coupled to the second ends of the optical fibers, wherein an area occupied by the first ends of the fibers is different from an area occupied by the second ends of the fibers.

10. The device of claim 8, wherein the first ends of the fibers are arranged in a first shape and the second ends of the fibers are arranged in a second shape different from the first shape.

11. The lamp device of claim 10, wherein the first shape and the second shape are selected from the group consisting of substantially circular, elliptical, rectangular, or another geometric shape.

12. The lamp device of claim 1, wherein the plurality of the light emitting diodes is radially disposed on one side of the substrate.

13. The lamp device of claim 12, wherein the plurality of the light emitting diodes is disposed at a regular interval on the one side of the substrate.

14. The lamp device of claim 1, wherein:
the substrate is coupled to all the light emitting diodes located between the substrate and the plate, and
the plurality of light emitting diodes are arranged in a predetermined pattern, and said one side of the substrate is a single integral surface coupled to the plurality of light emitting diodes in said predetermined pattern.

15. The lamp device of claim 1, wherein a number of the holes of the plate is greater than a number of the holes of the substrate.

16. A lamp device comprising:
a heat radiator comprising a body, a plurality of fins and a plate, wherein the body comprises an inner surface and an outer surface and an opening, wherein the plurality of fins are coupled to the outer surface of the body, and wherein the plate is coupled to ends of a plurality of the fins;
a substrate comprising a first surface coupled to the plate of the heat radiator; and
a plurality of light emitting diodes coupled to a second surface of the substrate opposite to the first surface of the substrate, wherein:
the plate has holes that correspond to intervals between respective ones of the plurality of fins,
the substrate has holes located between the plurality of light emitting diodes respectively,
at least two of the holes of the substrate corresponds to at least two of the holes of the plate,
air flowing through the holes in at least one of the plate or substrate removes heat radiating from the plurality of light emitting diodes, and
a same axis is aligned with and passes through the opening of the body and openings in the plate and the substrate.

17. A lamp device comprising:
a heat radiator comprising a body and a plurality of fins, wherein the body comprises an inner surface and an outer surface and an opening and wherein the plurality of fins are coupled to the outer surface of the body, wherein pairs of adjacent fins among the plurality of fins are spaced from each other at a regular interval;
a substrate comprising a plurality of light emitting diodes coupled to one side thereof and having a plurality of holes disposed therein, the substrate provided under the heat radiator; and
a fixing plate provided under the substrate and coupled to the heat radiator to cover the substrate including the light emitting diodes,
wherein a direction of the light emitted from the light emitting diodes is adjusted by a light guider which changes the direction of light,
wherein the substrate includes an opening in alignment with the opening in the body of the heat radiator and the fixing plate includes an opening in alignment with the opening in the substrate and the opening in the body of the heat radiator,
wherein a same axis is aligned with and passes through the opening of the body, the opening in the substrate, and the opening of the fixing plate, and
wherein the light emitted from the light emitting diodes is guided through the opening of the fixing plate.

18. The lamp device of claim 17,
wherein:
the heat radiator has an inner circumferential portion to allow the opening in the body to be exposed, and the light guider is coupled to a surface of the inner circumferential portion of the fixing surface.

19. The lamp device of claim 17, further comprising:
a plate located between the substrate and the body,
wherein the plate transfers heat generated from the plurality of the light emitting diodes coupled to the substrate to the body.

20. The lamp device of claim 17, wherein at least two of the holes of the substrate are located in alignment with the regular interval between at least one pair of the adjacent fins among the plurality of the fins.

* * * * *